(12) United States Patent
Cowie et al.

(10) Patent No.: US 10,801,287 B2
(45) Date of Patent: Oct. 13, 2020

(54) GATE VALVE

(71) Applicant: Interventek Subsea Engineering Limited, Aberdeen (GB)

(72) Inventors: Gavin David Cowie, Aberdeenshire (GB); John David Sangster, Aberdeen (GB)

(73) Assignee: Interventek Subsea Engineering Limited, Aberdeen (GB)

( * ) Notice: Subject to any disclaimer, the term of this patent is extended or adjusted under 35 U.S.C. 154(b) by 0 days.

(21) Appl. No.: 16/333,863

(22) PCT Filed: Nov. 7, 2017

(86) PCT No.: PCT/GB2017/053348
§ 371 (c)(1),
(2) Date: Mar. 15, 2019

(87) PCT Pub. No.: WO2018/096312
PCT Pub. Date: May 31, 2018

(65) Prior Publication Data
US 2019/0277106 A1     Sep. 12, 2019

(30) Foreign Application Priority Data
Nov. 22, 2016  (GB) .................... 1619693.3

(51) Int. Cl.
*E21B 29/04*     (2006.01)
*E21B 34/00*     (2006.01)
(Continued)

(52) U.S. Cl.
CPC .............. *E21B 29/04* (2013.01); *E21B 29/08* (2013.01); *E21B 34/00* (2013.01); *F16K 3/20* (2013.01)

(58) Field of Classification Search
CPC .......... E21B 29/08; E21B 34/00; E21B 29/04; F16K 3/20
(Continued)

(56) References Cited

U.S. PATENT DOCUMENTS 2,029,151 A * 1/1936 Bigelow ................... F16K 3/20
138/94.3
2,908,480 A * 10/1959 Hamer ...................... F16K 3/12
251/328

(Continued)

FOREIGN PATENT DOCUMENTS

| CA | 2141005 A1 | 8/1995 |
|----|-----------|--------|
| DE | 3704244 A1 | 8/1987 |

OTHER PUBLICATIONS

International Search Report PCT/ISA/210 for International Application No. PCT/GB2017/053348 dated Mar. 19, 2018.
(Continued)

*Primary Examiner* — Umashankar Venkatesan
(74) *Attorney, Agent, or Firm* — Harness, Dickey & Pierce, P.L.C.

(57) ABSTRACT

A first cutter is provided on an edge region of a first surface of a gate valve member to be moveable across the flow path with the gate valve member along a first cutting plane. A first seal pocket is defined by a depression in the first surface of the gate valve, wherein a second peripheral seal surface is provided within the first seal pocket. The first valve seat and the gate valve member are axially moveable relative to each other to permit a portion of the first valve seat to become received into the first seal pocket of the gate valve member when said gate valve member is located within its second position to provide sealing engagement between the first and second peripheral seal surfaces.

29 Claims, 8 Drawing Sheets

(51) Int. Cl.
    *E21B 29/08*    (2006.01)
    *F16K 3/20*    (2006.01)
(58) Field of Classification Search
    USPC .......................................................... 251/193
    See application file for complete search history.

(56) References Cited

U.S. PATENT DOCUMENTS

| | | | | |
|---|---|---|---|---|
| 3,446,476 | A * | 5/1969 | Scaramucci | F16K 3/0227 |
| | | | | 251/172 |
| 3,463,447 | A * | 8/1969 | Ripert | F16K 3/16 |
| | | | | 251/158 |
| 4,671,312 | A * | 6/1987 | Bruton | E21B 34/02 |
| | | | | 137/315.29 |
| 4,911,410 | A * | 3/1990 | Baker | E21B 29/04 |
| | | | | 251/1.3 |
| 5,803,431 | A * | 9/1998 | Hoang | E21B 29/04 |
| | | | | 251/326 |
| 2003/0127141 | A1 * | 7/2003 | Hoang | E21B 43/16 |
| | | | | 137/602 |

OTHER PUBLICATIONS

Written Opinion of the International Searching Authority PCT/ISA/237 for International Application No. PCT/GB2017/053348 dated Mar. 19, 2018.

International Preliminary Report on Patentability dated Jun. 6, 2019, issued in corresponding Application No. PCT/GB2017/053348.

* cited by examiner

GATE VALVE

CROSS-REFERENCE TO RELATED APPLICATIONS

This application is a national phase under 35 U.S.C. § 371 of PCT International Application No. PCT/GB2017/053348 which has an International filing date of Nov. 7, 2017, which claims priority to Great British Application No. 1619693.3, filed Nov. 22, 2016, the entire contents of each of which are hereby incorporated by reference.

FIELD

The present disclosure relates to a gate valve apparatus, for example which can be used to cut an object within a flow path prior to sealing said flow path.

BACKGROUND

Valves are used in numerous applications across a number of industries, primarily for flow/pressure control purposes. For example, in the oil and gas industry valves are used extensively in both upstream and downstream applications. Valves may be employed in a downhole environment, such as in sub-surface safety valves, downhole chokes, drill stem test valves and the like. Also, valves are typically used in topside applications (including subsea), such as in wellhead equipment, for example in production trees, blow out preventers (BOPs) and the like.

One type of valve in common use is the gate valve, which includes a valve member or gate which laterally slides across a flow path and cooperates with a gate seat when closed in order to seal the flow path. In some cases gate valves are unidirectional, such that they are designed to retain a pressure differential in only a single direction. In oil and gas applications gate valves are typically used to retain wellbore pressure and fluids.

In some applications, such as in the oil and gas industry, there may be a requirement for valves to cut any objects therein during closure. Such circumstances may arise when emergency closure of the valve is required, for example due to well control requirements and protocols, while tooling is deployed through the valve, for example on wireline or coiled tubing. Such valves may be referred to as shear and seal valves, as they must also provide a robust seal following any cut. However, in some cases valves seals may become compromised as a result of the cutting operations.

SUMMARY

An aspect of the present disclosure relates to a gate valve apparatus, comprising:
- a housing defining a flow path;
- a first valve seat located within the housing around a periphery of the flow path and comprising a first peripheral seal surface; and
- a gate valve member which is moveable laterally across the flow path between a first position in which the flow path is open and a second position in which the flow path is closed;
- a first cutter provided on an edge region of a first surface of the gate valve member to be moveable across the flow path with the gate valve member along a first cutting plane; and
- a first seal pocket defined by a depression in the first surface of the gate valve member, wherein a second peripheral seal surface is provided within the first seal pocket,
- wherein the first valve seat and the gate valve member are axially moveable relative to each other to permit a portion of the first valve seat to become received into the first seal pocket of the gate valve member when said gate valve member is located within its second position to provide sealing engagement between the first and second peripheral seal surfaces.

Accordingly, the second peripheral seal surface may be in a protected position by virtue of being in a recessed position. Such protection may be provided against mechanical damage, such as from elements of the gate valve apparatus which may have been deformed during a cutting operation, from an object being cut, and the like. The positioning of the second peripheral seal surface within the first seal pocket may provide clearance from a cutting plane, and thus from any deformed elements which act or are positioned on the cutting plane. This clearance may be closed, when the gate valve member is located in its closed position, by virtue of the ability of the first valve seat and gate valve member being axially moveable relative to each other.

The axial direction may be generally aligned with the flow path. The axial direction may be generally perpendicular relative to the lateral direction of movement of the gate valve member.

Any object located within the flow path may thus be cut, for example by a shearing cutting action, along the first cutting plane.

When the gate valve member is in its open position the flow path may be opened. When the gate valve member is in its closed position the flow path may be closed, and sealed by inter-engagement between the first and second peripheral seal surfaces.

The second peripheral seal surface may be provided within the first seal pocket such that the second peripheral seal surface is located outside of the first cutting plane The first cutting edge and the second peripheral seal surface, by being mounted on the same gate valve member, may be maintained at a fixed geometry relative to each other. This may maintain clearance between the second peripheral seal surface and the first cutting edge during operation of the gate valve apparatus.

The first cutting edge may be rigidly provided on the gate valve member. The first cutting edge may be directly formed on the edge region of the first surface of the gate valve member. Alternatively, the first cutting edge may be formed on a cutting insert which is rigidly secured to the edge region of the first surface of the gate valve member. The cutting insert may be replaceable.

The first surface of the gate valve member may slidably engage the first valve seat during lateral movement of the gate valve member. Accordingly, the first surface may define a bearing surface. The second peripheral seal surface may thus be protected during such sliding engagement by being recessed below the level of the first surface of the gate valve member. Such sliding engagement may be provided until the gate valve member reaches its closed position, at which point the first valve seat may become received within the first seal pocket.

Sliding engagement between the first valve seat and the first surface of the gate valve member may maintain the first cutting edge aligned with the first cutting plane during lateral movement of the gate valve member. When the gate valve member is in its closed position any object which was positioned within the flow path should have been fully severed, such that movement of the first cutting edge from the first cutting plane may be acceptable. Such movement of the first cutting edge from the first cutting plane may be established by relative axial movement between the gate valve member and the first valve seat.

The gate valve member and the first valve seat may be axially moveable relative to each other only when the gate valve member is in or is close to its closed position.

The geometry of the first seal pocket may complement or correspond to the geometry of the first valve seat. Such an arrangement may permit the first valve seat to only become received within the first seal pocket when the gate valve member is in its closed position. Further, such an arrangement may permit the first and second peripheral seal surfaces to be moved into engagement primarily by relative axial movement, minimising relative lateral movement therebetween which may otherwise compromise one or both of the first and second peripheral seal surfaces.

The gate valve member and the first valve seat may be axially moveable relative to each other in a first relative direction to permit the first valve seat to be received within the first seal pocket when the gate valve member is in its closed position.

The gate valve member and the first valve seat may be axially moveable relative to each other in a reverse second relative direction to permit the first valve seat to be removed from the first seal pocket when the gate valve member is moved from its closed position towards its open position. Relative axial movement in the second axial direction may be provided or initiated by lateral movement of the gate valve member from its closed position towards its open position.

The first seal pocket may be generally circular. The second peripheral seal surface may be generally annular. The second peripheral seal surface may be defined on a planar surface. The second peripheral seal surface may be defined on a sloping or ramped surface. The sloping or ramped surface may be linear, for example to be generally conical or frustrated-conical. The sloping or ramped surface may be curved, for example concave, convex or the like.

The first seal pocket may comprise or define a central region, which may define a base of the first seal pocket. The second peripheral seal surface may circumscribe the central region of the seal pocket. The central region may be positioned below the second peripheral seal surface. The central region of the first seal pocket may be aligned with the flow path of the housing when the gate valve member is in its closed position. Accordingly, the central region may define an impact region for any object or article which may travel into the housing of the gate valve apparatus, for example due to being dropped. By virtue of the central region defining a base of the first seal pocket, any damage to the central region by any impact may have minimal effect on one or both of the first and second peripheral seal surfaces.

The first valve seat may comprise a second cutting edge configured to cooperate with the first cutting edge of the gate valve member to cut an object located therebetween, for example by a shearing action.

The second cutting edge may be rigidly provided on the first valve seat. The second cutting edge may be directly formed on the first valve seat. Alternatively, the second cutting edge may be formed on a cutting insert which is rigidly secured to the first valve seat. The cutting insert may be replaceable.

The second cutting edge may define an inner periphery of the first valve seat. The first peripheral seal surface may be positioned radially outwardly of the second cutting edge. The first peripheral seal surface may circumscribe the second cutting edge.

The first peripheral seal surface may be recessed or relieved relative to the second cutting edge. For example, the first peripheral sealing surface may be inclined, for example ramped or sloping, relative to the second cutting edge.

Accordingly, the first peripheral seal surface may be in a protected position by virtue of being recessed or relieved from the second cutting edge. Such protection may be provided against mechanical damage, such as from elements of the gate valve apparatus (such as the first cutting edge) which may have been deformed during a cutting operation, from an object being cut, and the like. The positioning or arrangement of the first peripheral seal surface may provide clearance from a cutting plane, and thus from any deformed elements (such as the first cutting edge) which act or are positioned on the cutting plane. This clearance may be closed, when the gate valve member is located in its closed position, by virtue of the first valve seat and gate valve member being axially moveable relative to each other.

The second cutting edge may bear against the first surface of the gate valve member during lateral movement of said gate valve member. Accordingly, during such lateral movement the first surface of the gate valve member may be at risk of damage from the second cutting edge. However, as the second peripheral seal surface is recessed relative to the first surface, corresponding damage to the second peripheral seal surface may be avoided or minimised. Furthermore, any damage caused to the first surface may have minimal detrimental effect on the first peripheral seal surface, by virtue of said first peripheral seal surface being recessed relative to the second cutting edge.

Thus, by the first and second peripheral seal surfaces being in a recessed or relieved position, damage to such surfaces may be minimised, for example from deformed elements of one, some or all of the first and second cutting edges and the first surface of the gate valve member.

The first valve seat may form part of the housing, for example an integral part of the housing.

The first valve seat may be mounted within a pocket provided within the housing. The first valve seat may be sealingly mounted within a pocket provided within the housing.

The gate valve apparatus may be configured to provide sealing against a pressure differential in a single direction across the gate valve member when closed.

The gate valve apparatus may be configured to provide sealing against a pressure differential in reverse directions across the gate valve member when closed.

Relative axial movement between the first valve seat and the gate valve member may facilitate sealing to be achieved in one or both directions across the gate valve member when closed.

Relative axial movement between the first valve seat and the gate valve member may be achieved by a bias arrangement. Relative axial movement between the first valve seat and the gate valve member may be achieved by virtue of fluid acting within the valve apparatus, such as fluid flow, fluid pressure and the like.

In one example the first valve seat may be axially moveable relative to the housing. The first valve seat may be biased towards engagement with the gate valve member. For example, the first valve seat may be spring biased towards engagement with the gate valve member. Such spring bias may be achieved by a Belleville washer spring or spring stack, for example.

Only one of the first valve seat and the gate valve member may be axially moveable within the housing. Accordingly, relative axial movement between the first valve seat and the gate valve member may be achieved by movement of only one of the first valve seat and the gate valve member.

Alternatively, both the first valve seat and the gate valve member may be axially moveable within the housing to permits relative axial movement therebetween.

Movement of both of the first valve seat and the gate valve member may facilitate sealing within the valve apparatus in reverse directions.

One or both of the first and second peripheral sealing surfaces may comprise one or more sealing elements, such as elastomeric sealing elements, PTFE sealing elements or the like.

The gate valve apparatus may comprise a second valve seat located within the housing on an opposing side of the gate valve member from the first valve seat. The second valve seat may be located around a periphery of the flow path. The second valve seat may comprise a third peripheral seal surface.

The gate valve member may comprise a third cutting edge provided on an edge region of a second surface (opposite the first surface) of the gate valve member and moveable across the flow path with the gate valve member. The second valve seat may comprise a fourth cutting edge which cooperates with the third cutting edge to cut an object located therebetween. The third peripheral seal surface may be recessed or relieved relative to the fourth cutting edge.

A second seal pocket may be defined by a depression in the second surface of the gate valve member, wherein a fourth peripheral seal surface is provided within the second seal pocket. The fourth peripheral seal pocket may be provided to be recessed relative to the third cutting edge.

The second valve seat and the gate valve member may be axially moveable relative to each other when said gate valve member is located within its closed position to permit the second valve seat to become received into the second seal pocket of the gate valve member and establish sealing engagement between the third and fourth peripheral seal surfaces.

The second valve seat may be configured similar or identical to the first valve seat, and the interaction between the second valve seat and the gate valve member may be the same as the interaction between the first valve seat and the gate valve member. Accordingly, no further description is provided for brevity.

During operation of the valve apparatus, any object located within the flow path will be cut by both the first and third cutting edges of the gate valve member. This may permit a section or slug of the object to be removed. This may minimise the requirement for a portion of the object being cut to be deformed and displaced by movement of the gate valve member to allow said gate valve member to be positioned in its closed position. Such deformation may otherwise apply a bias force on the gate valve member, seeking to move the gate valve member towards its open position, which may be undesirable in some circumstances.

The gate valve apparatus may comprise a receptacle for receiving sections or slugs of an object following a cutting operation.

The provision of the first and second valve seats on opposing sides of the gate valve member may assist to facilitate sealing in opposing directions along the flow path when the gate valve member is in its closed position.

In one example, both the first and second valve seats may be rigidly mounted within the housing, and the valve member is axially moveable. Such axial movement may be achieved by virtue of a pressure differential across the gate valve member when in its closed position.

The gate valve apparatus may comprise a valve stem coupled with the gate valve member to facilitate lateral movement of the gate valve member. The valve stem may be configured to be coupled to an actuator.

The gate valve member and the valve stem may be coupled together via a stem connector. The stem connector may facilitate a rigid connection between the gate valve member and the valve stem in at least one direction, such as a lateral direction.

The stem connector may permit the gate valve member to move axially within the housing without corresponding movement of the valve stem. For example, the stem connector may comprise a sliding connector.

The gate valve apparatus may comprise an actuator for operating the gate valve member. The actuator may comprise a mechanical actuator. For example, the actuator may comprise a lead-screw actuator. The actuator may comprise a fluid actuator, such as a piston actuator.

The housing may be configured for connection to a flow system, such that the flow path through the housing defines part of the flow system. The housing may comprise one or more connectors, such as flange-type connectors.

The gate valve apparatus may be configured to be coupled to infrastructure associated with a wellbore, such as a wellbore provided to communicate with a subterranean formation, for example a hydrocarbon bearing formation.

The gate valve apparatus may be configured for use in top-side applications, for example onshore, on an offshore rig or vessel or the like.

The gate valve apparatus may be configured for use subsea.

The gate valve apparatus may be configured for use as part of a well control apparatus or package.

An aspect of the present disclosure relates to a method for providing fluid control along a flow path. The method may comprise operation of a gate valve apparatus according to any other aspect or example.

An aspect of the present disclosure relates to a gate valve apparatus, comprising:
  a housing defining a flow path;
  a first valve seat located within the housing around a periphery of the flow path and comprising a first peripheral seal surface;
  a second valve seat located within the housing around a periphery of the flow path and comprising a second peripheral seal surface; and
  a gate valve assembly which is moveable laterally across the flow path between an open position and a closed position, wherein the gate valve assembly comprises:
    a valve carriage;
    first and second axially separated cutting edges provided on the valve carriage to be moveable across the flow path with the gate valve assembly;
    a valve member assembly mounted on the valve carriage;
    a first seal pocket defined by a depression in a first surface of the valve member assembly, wherein a third peripheral seal surface is provided within the first seal pocket; and
    a second seal pocket defined by a depression in an opposite second surface of the valve member assembly, wherein a fourth peripheral seal surface is provided within the second seal pocket, wherein the valve member assembly is axially moveable relative to the valve carriage such that when the gate valve assembly is in its closed position relative axial movement may be established between the valve member assembly and the respective first and second valve seats such that the first valve seat is receivable into the first seal pocket to establish sealing engagement between the first and third peripheral seal surfaces, and the first valve seat is receivable into the first seal pocket to establish sealing engagement between the second and fourth peripheral seal surfaces.

Accordingly, the third and fourth peripheral seal surfaces may be in a protected position by virtue of being recessed from the first and second cutting edges, respectively. Such protection may be provided against mechanical damage, such as from elements of the gate valve apparatus which may have been deformed during a cutting operation, from an object being cut, and the like. The positioning of the third and fourth peripheral seal surfaces within the respective first and second seal pockets may provide clearance from a cutting plane, and thus from any deformed elements which act or are positioned on the cutting plane. This clearance may be closed, when the gate valve assembly is located in its closed position, by virtue of the ability of the first and second valve seat and valve member assembly being axially moveable relative to each other.

The axial direction may be generally aligned with the flow path. The axial direction may be generally perpendicular relative to the lateral direction of movement of the valve member assembly.

The first and second cutting edges may be moveable along a first cutting plane during lateral movement of the gate valve apparatus. Any object located within the flow path may thus be cut, for example by a shearing cutting action, along the first cutting plane.

When the gate valve assembly is in its open position the flow path may be opened. When the gate valve assembly is in its closed position the flow path may be closed, and sealed by inter-engagement between one or both of the first and third peripheral seal surfaces and the second and fourth peripheral seal surfaces.

The gate valve assembly may comprise an interface arrangement interposed between the valve member assembly and the valve carriage. The interface arrangement may permit the valve member assembly to be mounted in or on the valve carriage. The interface arrangement may comprise a slot and pin arrangement. One of the valve member assembly and the valve carriage may comprise a slot and the other of the valve member assembly and the valve carriage may comprise a pin to be received in the slot. In one example, the valve carriage comprises the slot and the valve member assembly comprises the pin.

Both of the valve member assembly and the valve carriage may comprise a component of the interface arrangement, for example the valve carriage may comprise a slot and the valve member assembly may comprise a pin, for engagement with the slot. Alternatively or additionally, the valve carriage may comprise a pin and the valve member assembly may comprise a slot.

The valve member assembly may comprise a single valve member. The first and second seal pockets may be formed in opposing surfaces of the single valve member. The opposite surfaces may define the first and second surfaces of the valve member assembly.

The valve member assembly may comprise a plurality of valve members. The plurality of valve members may be assembled together to form or define the valve member assembly.

The valve member assembly may comprise first and second valve members mounted relative to one another, for example in or on the valve carriage, to form the valve member assembly. The first valve member may comprise the first seal pocket and the second valve member may comprise the second seal pocket.

Both of the first and second valve members may be moveable relative to the valve carriage. The first and second valve members may be independently moveable relative to the valve carriage.

The valve member assembly may comprise a biasing arrangement. The biasing arrangement may comprise one or more biasing members. The biasing member may be or comprise a spring, for example a helical spring.

The biasing arrangement may be configured to bias movement of the first valve member towards the first valve seat. The biasing arrangement may be configured to bias movement of the second valve member towards the second valve seat. The biasing arrangement may be configured to urge the first valve member and the second valve member apart.

The biasing arrangement may be mounted on the valve carriage.

The biasing arrangement may be mounted on, for example form part of, the valve member assembly. The biasing arrangement may be mounted and contained between (e.g. axially between) the first and second valve members. The valve member assembly may comprise an engagement profile on which the biasing arrangement may be mounted. One or each of the valve members may comprise an engagement profile on which the biasing arrangement may be mounted. The first and second valve members may comprise an engagement profile on opposing and/or adjacent surfaces. The biasing arrangement may be mounted on the engagement profile of both the first and second valve members. The engagement profile of the first valve member may be identical to, or a mirror image of, the engagement profile of the second valve member.

When the gate valve assembly is in the closed position, the biasing arrangement may facilitate engagement between the first peripheral seal surface of the first valve seat and the third peripheral seal surface of the first seal pocket by biasing movement of the first valve member towards the first valve seat. Similarly, when the gate valve assembly is in the closed position, the biasing arrangement may facilitate engagement between the second peripheral seal surface of the second valve seat and the fourth peripheral seal surface of the second seal pocket by biasing movement of the second valve member towards the second valve seat. In both occasions, this may lead to, for example, better or quicker sealing capabilities and/or reduced likelihood of debris settling on the seal surfaces.

The first cutting edge may be rigidly provided on the gate valve assembly. The first cutting edge may be rigidly provided on the valve carriage of the gate valve assembly.

The second cutting edge may be rigidly provided on the gate valve assembly. The second cutting edge may be rigidly provided on the valve carriage of the gate valve assembly. The first and/or second cutting edge may be formed on a cutting insert which is rigidly secured to the gate valve assembly. The cutting insert may be replaceable.

The first surface of the valve member assembly may slidably engage the first valve seat during lateral movement of the gate valve assembly. Accordingly, the first surface may define a bearing surface. The third peripheral seal surface may thus be protected during such sliding engagement by being recessed below the level of the first surface of the valve member assembly. Such sliding engagement may be provided until the valve member assembly reaches its closed position, at which point the first valve seat may become received within the first seal pocket.

The second surface of the valve member assembly may slidably engage the second valve seat during lateral movement of the valve member assembly. Accordingly, the second surface may define a bearing surface. The fourth peripheral seal surface may thus be protected during such sliding engagement by being recessed below the level of the second surface of the valve member assembly. Such sliding engagement may be provided until the valve member assembly reaches its closed position, at which point the second valve seat may become received within the first seal pocket.

The valve member assembly and the first valve seat may be axially moveable relative to each other only when the valve member apparatus is in or is close to its closed position.

The valve member assembly and the second valve seat may be axially moveable relative to each other only when the valve member apparatus is in or is close to its closed position.

The geometry of the first seal pocket may complement or correspond to the geometry of the first valve seat. Such an arrangement may permit the first valve seat to only become received within the first seal pocket when the gate valve assembly is in its closed position. Further, such an arrangement may permit the first and third peripheral seal surfaces to be moved into engagement primarily by relative axial movement, minimising relative lateral movement therebetween which may otherwise comprise one or both of the first and third peripheral seal surfaces.

The geometry of the second seal pocket may complement or correspond to the geometry of the second valve seat. Such an arrangement may permit the second valve seat to only become received within the second seal pocket when the gate valve assembly is in its closed position. Further, such an arrangement may permit the second and fourth peripheral seal surfaces to be moved into engagement primarily by relative axial movement, minimising relative lateral movement therebetween which may otherwise comprise one or both of the second and fourth peripheral seal surfaces.

The valve member assembly and the first valve seat may be axially moveable relative to each other in a first relative direction to permit the first valve seat to be received within the first seal pocket when the valve member assembly is in its closed position.

The valve member assembly and the first valve seat may be axially moveable relative to each other in a reverse second relative direction to permit the first valve seat to be removed from the first seal pocket when the gate valve assembly is moved from its closed position towards its open position. Relative axial movement in the second axial direction may be provided or initiated by lateral movement of the gate valve assembly from its closed position towards its open position.

The valve member assembly and the second valve seat may be axially moveable relative to each other in a first relative direction to permit the second valve seat to be received within the second seal pocket when the gate valve assembly is in its closed position.

The valve member assembly and the second valve seat may be axially moveable relative to each other in a reverse second relative direction to permit the second valve seat to be removed from the second seal pocket when the gate valve assembly is moved from its closed position towards its open position. Relative axial movement in the second axial direction may be provided or initiated by lateral movement of the gate valve assembly from its closed position towards its open position.

The first seal pocket may be generally circular. The third peripheral seal surface may be generally annular. The third peripheral seal surface may be defined on a planar surface. The third peripheral seal surface may be defined on a sloping or ramped surface. The sloping or ramped surface may be linear, for example to be generally conical or frustrated-conical. The sloping or ramped surface may be curved, for example concave, convex or the like.

The second seal pocket may be generally circular. The fourth peripheral seal surface may be generally annular. The fourth peripheral seal surface may be defined on a planar surface. The fourth peripheral seal surface may be defined on a sloping or ramped surface. The sloping or ramped surface may be linear, for example to be generally conical or frustrated-conical. The sloping or ramped surface may be curved, for example concave, convex or the like.

The first seal pocket may comprise or define a first central region, which may define a base of the first seal pocket. The second peripheral seal surface may circumscribe the central region of the seal pocket. The first central region may be positioned below the second peripheral seal surface. The first central region of the first seal pocket may be aligned with the flow path of the housing when the gate valve apparatus is in its closed position. Accordingly, the first central region may define an impact region for any object or article which may travel into the housing of the gate valve apparatus, for example due to being dropped. By virtue of the first central region defining a base of the first seal pocket, any damage to the first central region by any impact may have minimal effect on one or both of the first and second peripheral seal surfaces.

The second seal pocket may comprise or define a second central region, which may define a base of the second seal pocket. The fourth peripheral seal surface may circumscribe the second central region of the seal pocket. The second central region may be positioned below the fourth peripheral seal surface. The second central region of the first seal pocket may be aligned with the flow path of the housing when the valve member apparatus is in its closed position. Accordingly, the second central region may define an impact region for any object or article which may travel into the housing of the gate valve apparatus, for example due to being dropped. By virtue of the second central region defining a base of the first seal pocket, any damage to the second central region by any impact may have minimal effect on one or both of the first and second peripheral seal surfaces.

The first valve seat may comprise a third cutting edge configured to cooperate with the first cutting edge of the valve member apparatus to cut an object located therebetween, for example by a shearing action.

The second valve seat may comprise a fourth cutting edge configured to cooperate with the second cutting edge of the valve member assembly to cut an object located therebetween, for example by a shearing action.

The third cutting edge may be rigidly provided on the first valve seat. The third cutting edge may be directly formed on the first valve seat.

The fourth cutting edge may be rigidly provided on the second valve seat. The fourth cutting edge may be directly formed on the second valve seat.

Alternatively, the third and/or fourth cutting edge may be formed on a cutting insert which is rigidly secured to the first and/or second valve seat. The cutting insert may be replaceable.

The third cutting edge may define an inner periphery of the first valve seat. The first peripheral seal surface may be positioned radially outwardly of the third cutting edge. The first peripheral seal surface may circumscribe the third cutting edge.

The fourth cutting edge may define an inner periphery of the second valve seat. The second peripheral seal surface may be positioned radially outwardly of the fourth cutting edge. The second peripheral seal surface may circumscribe the fourth cutting edge.

The first peripheral seal surface may be recessed or relieved relative to the third cutting edge. For example, the first peripheral sealing surface may be inclined, for example ramped or sloping, relative to the third cutting edge.

Accordingly, the first peripheral seal surface may be in a protected position by virtue of being recessed or relieved from the third cutting edge, and the second peripheral seal surface may be in a protected position by virtue of being recessed or relieved from the fourth cutting edge. Such protection may be provided against mechanical damage, such as from elements of the gate valve apparatus (such as the first cutting edge) which may have been deformed during a cutting operation, from an object being cut, and the like. The positioning or arrangement of the first peripheral seal surface may provide clearance from a cutting plane, and thus from any deformed elements (such as the first cutting edge) which act or are positioned on the cutting plane. This clearance may be closed, when the gate valve assembly is located in its closed position, by virtue of the ability of the first valve seat and gate valve assembly being axially moveable relative to each other.

The third cutting edge may bear against the first surface of the valve member assembly, and the fourth cutting edge may bear against the second surface of the valve member assembly, during lateral movement of the gate valve assembly. Accordingly, during such lateral movement the first surface of the valve member assembly may be at risk of damage from the third cutting edge, and the second surface of the valve member assembly may be at risk of damage from the fourth cutting edge. However, as the third and fourth peripheral seal surface is recessed relative to the respective first and second surface of the valve member assembly, corresponding damage to the third and/or fourth peripheral seal surface may be avoided. Furthermore, any damage caused to the first and/or second surface may have minimal detrimental effect on the first and/or second peripheral seal surface, by virtue of said first and/or second peripheral seal surface being recessed relative to the respective third and fourth cutting edge.

Thus, by the first and third, and second and fourth, peripheral seal surfaces being in a recessed position, damage to such surfaces may be minimised, for example from deformed elements of one, some or all of the first and third, or second and fourth cutting edges and the first or second surface of the valve member assembly.

The first and/or second valve seat may form part of the housing, for example an integral part of the housing.

The first and/or second valve seat may be mounted within a pocket provided within the housing. The first and/or second valve seats may be sealingly mounted within a pocket provided within the housing.

The gate valve apparatus may be configured to provide sealing against a pressure differential in a single direction across the gate valve assembly when closed.

The gate valve apparatus may be configured to provide sealing against a pressure differential in reverse directions across the gate valve assembly when closed.

Relative axial movement between the first valve seat and the valve member assembly may facilitate sealing to be achieved in one or both directions across the gate valve assembly when closed.

Relative axial movement between the first valve seat and the valve member assembly may be achieved by the bias arrangement. Relative axial movement between the first valve seat and the valve member assembly may be achieved by virtue of fluid acting within the valve apparatus, such as fluid flow, fluid pressure and the like.

In one example the first and/or second valve seat may be axially moveable relative to the housing. The first and/or second valve seat may be biased towards engagement with the valve member apparatus. For example, the first and/or second valve seat may be sorting biased towards engagement with the valve member apparatus. Such spring bias may be achieved by a Belleville washer spring.

Only one of the first valve seat and the valve member assembly may be axially moveable within the housing. Accordingly, relative axial movement between the first valve seat and the valve member apparatus may be achieved by movement of only one of the first valve seat and the valve member apparatus.

Only one of the second valve seat and the valve member assembly may be axially moveable within the housing. Accordingly, relative axial movement between the second valve seat and the valve member assembly may be achieved by movement of only one of the second valve seat and the valve member assembly.

Alternatively, both the first and/or second valve seat and the valve member assembly may be axially moveable within the housing to permit relative axial movement therebetween.

Movement of both of the first and/or second valve seat and the valve member assembly may facilitate sealing within the valve apparatus in reverse directions.

One or both of the first, second, third and fourth peripheral sealing surfaces may comprise one or more sealing elements, such as elastomeric sealing elements, PTFE sealing elements or the like.

The second valve seat may be located within the housing on an opposing side of the valve member apparatus from the first valve seat. The second valve seat may be located around a periphery of the flow path.

The second valve seat may be configured similar or identical to the first valve seat, and the interaction between the second valve seat and the valve member apparatus may be the same as the interaction between the first valve seat and the valve member apparatus. Accordingly, no further description is provided for brevity.

During operation of the valve apparatus, any object located within the flow path will be cut by both the first and second cutting edges of the gate valve assembly. This may permit a section or slug of the object to be removed. This may minimise the requirement for a portion of the object being cut to be deformed and displaced by movement of the gate valve assembly to allow said gate valve assembly to be positioned in its closed position. Such deformation may otherwise apply a bias force on the gate valve assembly, seeking to move the gate valve assembly towards its open position, which may be undesirable in some circumstances.

The gate valve apparatus may comprise a receptacle for receiving sections or slugs of an object following a cutting operation.

The provision of the first and second valve seats on opposing sides of the gate valve assembly may assist to facilitate sealing in opposing directions along the flow path when the gate valve assembly is in its closed position.

In one example, both the first and second valve seats may be rigidly mounted within the housing, and the gate valve assembly is axially moveable. Such axial movement may be achieved by virtue of a pressure differential across the gate valve apparatus when in its closed position.

The gate valve apparatus may comprise a valve stem coupled with the gate valve assembly to facilitate lateral movement of the gate valve assembly. The valve stem may be configured to be coupled to an actuator.

The gate valve assembly and the valve stem may be coupled together via a stem connector. The stem connector may facilitate a rigid connection between the gate valve assembly and the valve stem in at least one direction, such as a lateral direction.

The stem connector may permit the gate valve member assembly to move axially within the housing without corresponding movement of the valve stem. For example, the stem connector may comprise a sliding connector.

The gate valve apparatus may comprise an actuator for operating the gate valve member assembly. The actuator may comprise a mechanical actuator. For example, the actuator may comprise a lead-screw actuator. The actuator may comprise a fluid actuator, such as a piston actuator.

The housing may be configured for connection to a flow system, such that the flow path through the housing defines part of the flow system. The housing may comprise one or more connectors, such as flange-type connectors.

The gate valve apparatus may be configured to be coupled to infrastructure associated with a wellbore, such as a wellbore provided to communicate with a subterranean formation, for example a hydrocarbon bearing formation.

The gate valve apparatus may be configured for use in top-side applications, for example onshore, on an offshore rig or vessel or the like.

The gate valve apparatus may be configured for use subsea.

The gate valve apparatus may be configured for use as part of a well control apparatus or package.

An aspect of the present disclosure relates to a method for providing fluid control along a flow path. The method may comprise operation of a gate valve apparatus according to any other aspect or example.

DETAILED DESCRIPTION OF THE DRAWINGS

Examples of a gate valve apparatus are provided below. The examples provided may be used in multiple applications, for example in applications associated with well operations (e.g., oil and gas well operations). In some cases the examples may be utilised in top-side applications. In other cases the examples may be utilised in subsea applications, for example in open water.

Figure 1:
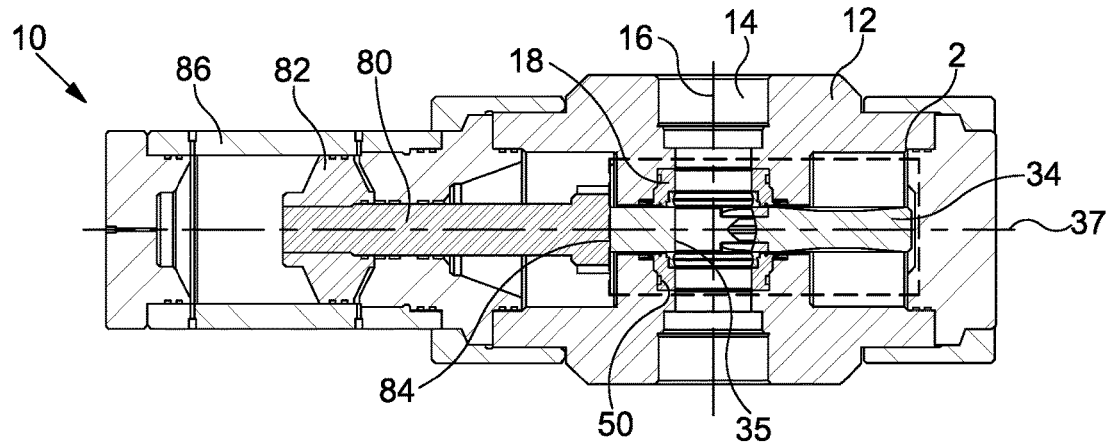
FIG. 1 is a cross sectional view of a gate valve apparatus, illustrated in an open configuration.

An example gate valve apparatus 10 will be described with initial reference to FIGS. 1, 2 and 3. In this case FIG. 1 provides a cross-sectional view of the gate valve apparatus 10, with an enlarged view of region 2 of FIG. 1 shown in FIG. 2. A sectional and perspective view of the gate valve apparatus 10 is provided in FIG. 3.

The gate valve apparatus 10 includes a housing 12 which defines a flow path 14 which extends along a longitudinal axis 16. A first valve seat 18 is located within the housing 12 around a periphery of the flow path 14. In the present example the first valve seat 18 is provided as a separate insert which is mounted within a receptive pocket 20 of the housing, and sealed with a dynamic seal 22. The first valve seat 18 is biased in a downward direction (specified with reference to the orientation of the drawing for convenience only) by action of a Belleville washer spring 24. Other biasing arrangements are of course possible.

The first valve seat 18 includes a cutting insert 26 which defines a peripheral cutter or cutting edge 28. For the purposes of the present description the cutting edge 28 will be referred to as a second cutting edge 28. The first valve seat 18 further includes a first peripheral seal surface 30 which tapers upwardly and outwardly from the cutting insert 26, and caries a seal member 32. The taper of the first peripheral seal surface 30 provides relief between said seal surface 30 and a first cutting plane 33 defined by the second cutting edge 28. This therefore positions the first peripheral seal surface 30 in a protected position, minimising damage which might be caused from elements acting along the first cutting plane 33, as described in more detail below.

Figure 2:
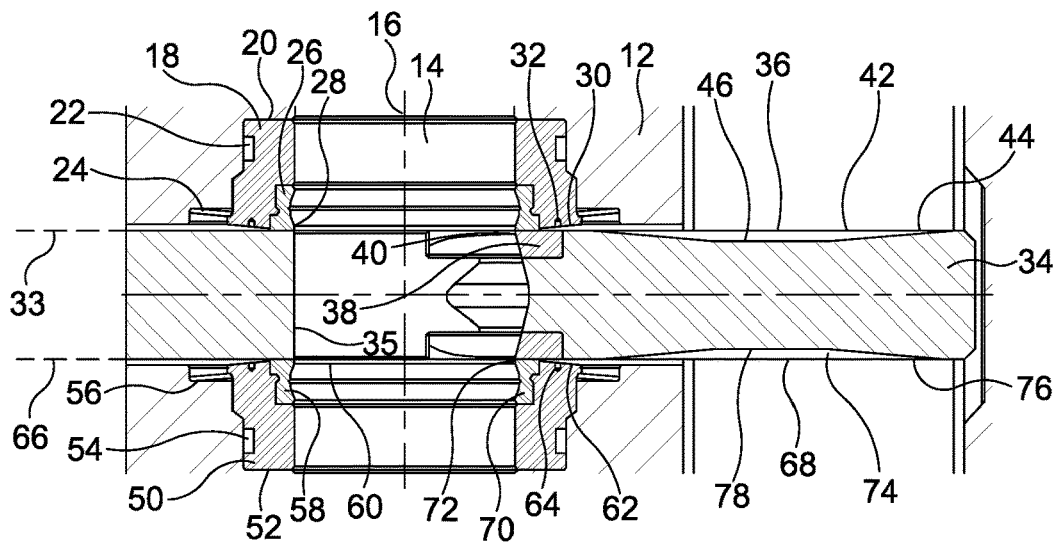
FIG. 2 is an enlarged view of region 2 of FIG. 1.
Figure 3:
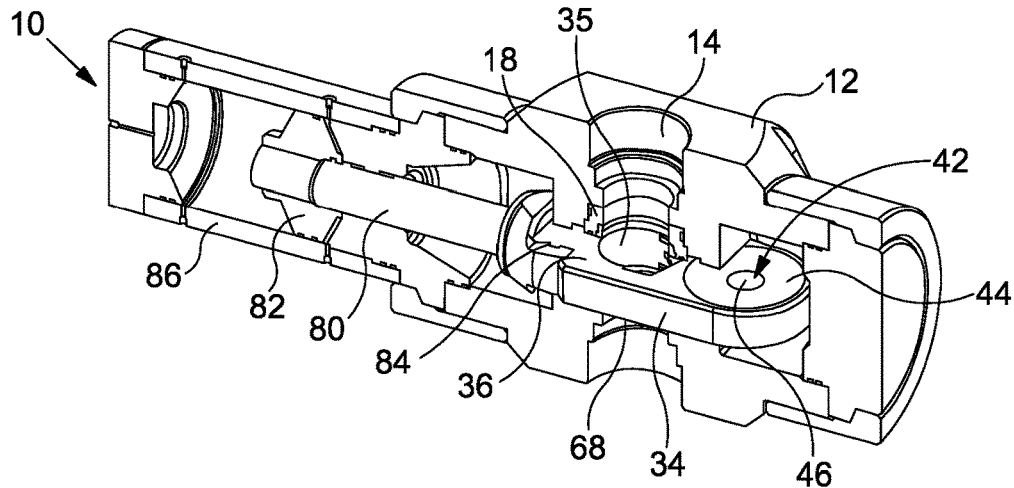
FIG. 3 is a sectional isometric view of the gate valve apparatus of FIG. 1.

The apparatus 10 comprises a gate valve member 34 which is moveable laterally across the flow path 14, generally along a lateral axis 37, from an open position, as illustrated in FIGS. 1, 2 and 3, to a closed position, described and illustrated later. The gate valve member 34 includes a through bore 35 which is aligned with the flow path 14 when the gate valve member 34 is in its open position.

The gate valve member 34 includes a generally planar first or upper surface 36 which is directed towards the first valve seat 18. A cutting insert 38 is mounted on an edge region of the first surface 36 of the gate valve member 34 (partially around the through bore 35), wherein the cutting insert 38 defines a first cutter or cutting edge 40 which is moveable across the flow path 14 with the gate valve member 34 along the first cutting plane 33. As will be described in more detail below, the first cutting edge 40 provided on the gate valve member 34 will cooperate with the second cutting edge 28 provided on the first valve seat 18 to cut through or shear any object extending through the flow path 14 during closing of the gate valve member 34.

A first seal pocket 42 is defined by a dish-shaped depression in the first surface 36 of the gate valve member 34. A second peripheral seal surface 44 is provided within the first seal pocket 42, tapering downwardly from the first surface 36, such that the second peripheral seal surface 44 is located outside or relieved from the first cutting plane 33, assisting to minimise damage which might be caused from elements (such as the second cutting edge 28 of the first seat 18) acting along the first cutting plane 33.

The geometry of the second peripheral seal surface 44 complements or corresponds to the geometry of the first peripheral seal surface 30 of the first valve seat 18, such that the first and second peripheral seal surfaces 30, 44 may be sealingly engaged when the gate valve member 34 is closed. In this respect, relative axial movement (in the direction of axis 16) is permitted between the first valve seat 18 and the gate valve member 34, for example by action of the Belleville washer spring and/or any pressure differential across the valve member 34 when closed, to cause the first valve seat 18 to become received into the first seal pocket 42.

The first seal pocket 42 includes a central region 46 which defines a base of the first seal pocket 42. This central region 46 will become aligned with the flow path 14 when the gate valve member 34 is in its closed position. Accordingly, the central region 46 may define a depressed impact region for any object or article which may travel into the gate valve apparatus 10, for example due to being dropped. By virtue of the central region 46 defining a base of the first seal pocket, any damage to the central region 46 by any impact may have minimal effect on one or both of the first and second peripheral seal surface 30, 44.

A second valve seat 50 is located within the housing 12 around a periphery of the flow path 14, on an opposite side of the gate valve member 34 form the first valve seat 18. As will be described below, the second valve seat 50 is similar to the first valve seat 18, and the gate valve member 34 is further configured to interact with the second valve seat 50 in the same manner as with the first valve seat 18.

The second valve seat 50 is provided as a separate insert which is mounted within a receptive pocket 52 of the housing 12, and sealed with a dynamic seal 54. The second valve seat 50 is biased in an upward direction (specified with reference to the orientation of the drawing for convenience only) by action of a Belleville washer spring 56.

The second valve seat 50 includes a cutting insert 58 which defines a peripheral cutter or cutting edge 60. For the purposes of the present description the cutting edge 60 will be referred to as a fourth cutting edge 60. The second valve seat 50 further includes a third peripheral seal surface 62 which tapers upwardly and outwardly from the cutting insert 58 and caries a seal member 64. The taper of the third peripheral seal surface 62 provides relief between said seal surface 62 and a second cutting plane 66 defined by the fourth cutting edge 60. This therefore positions the third peripheral seal surface 62 in a protected position, minimising damage which might be caused from elements acting along the second cutting plane 66, as described in more detail below.

The gate valve member 34 includes a generally planar second or lower surface 68 which is directed towards the second valve seat 50. A cutting insert 70 is mounted on an edge region of the second surface 68 of the gate valve member 34 (partially around the through bore 35), wherein the cutting insert 70 defines a third cutter or cutting edge 72 which is moveable across the flow path 14 with the gate valve member 34 along the first cutting plane 66. As will be described in more detail below, the third cutting edge 72 provided on the gate valve member 34 will cooperate with the fourth cutting edge 60 of the second valve seat 50 to cut through or shear any object extending through the flow path 14 during closing of the gate valve member 34.

A second seal pocket 74 is defined by a dish-shaped depression in the second surface 68 of the gate valve member 34. A fourth peripheral seal surface 76 is provided within the second seal pocket 74, tapering from the second surface 68, such that the fourth peripheral seal surface 76 is located outside or relieved from the second cutting plane 66, assisting to minimise damage which might be caused from elements (such as the fourth cutting edge 60 of the second seat 50) acting along the second cutting plane 66.

The geometry of the fourth peripheral seal surface 76 complements or corresponds to the geometry of the third peripheral seal surface 62 of the second valve seat 50, such that the third and fourth peripheral seal surfaces 62, 76 may be sealingly engaged when the gate valve member 34 is closed. In this respect, relative axial movement (in the direction of axis 16) is permitted between the second valve seat 50 and the gate valve member 34, for example by action of the Belleville washer spring and/or any pressure differential across the valve member 34 when closed, to cause the second valve seat 50 to become received into the second seal pocket 74.

The second seal pocket 42 includes a central region 78 which defines a base of the first seal pocket 42.

The gate valve apparatus 10 further comprises a valve stem 80 which is coupled at one end to a hydraulic piston 82, and at an opposite end to the gate valve member 34 via a stem connector 84. The stem connector 84 facilitates a rigid connection between the valve stem 80 and gate valve member 34 in the direction of axis 36, but permits a degree of freedom in the direction of axis 16. Thus, the valve member 34 is permitted to move axially within the housing 12.

The piston 82 is arranged to stroke within a cylinder 86 to cause movement of the valve member 34 between its open and closed position. As such, in the example shown the valve apparatus 10 is hydraulically operated. However, any other actuator type may be utilised, such as electrical, mechanical or the like.

Figure 4A:
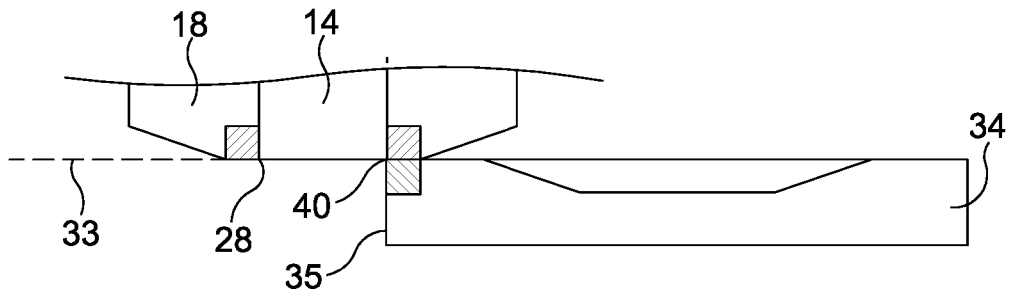
FIGS. 4A to 4C provide a schematic sequential illustration of the interaction of a valve seat and one side of a valve member of the valve apparatus of FIG. 1 during a closing operation.
Figure 4B:
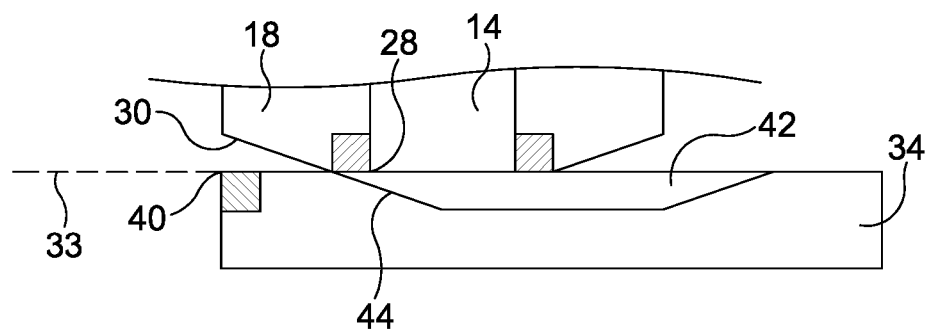
Figure 4C:
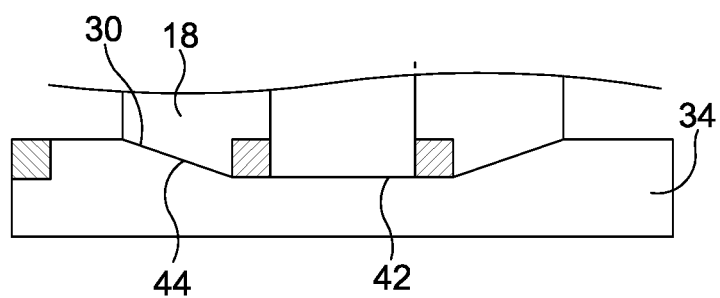

FIGS. 4A-C are simplified illustrations of part of the gate valve member 34 and the first valve seat 18 as the gate valve member 34 moves from its open position (shown in FIG. 4A) to its closed position (shown in FIG. 4C). In FIG. 4A, the gate valve member 34 is in its fully open position and the flow path 14 is aligned with throughbore 35, with the first and second cutting edges 40, 28 aligned with the first cutting plane 33.

FIG. 4B shows the valve member 34 partially closed, and in a post cut position (i.e., the first cutting edge 40 has completely travelled past the second cutting edge 28). In this position, the first valve seat 18 is not yet fully aligned with the first seal pocket 42 of the valve member 34, and the first and second cutting edges 40, 28 are maintained on the first cutting plane. As illustrated (slightly exaggerated for clarity), both the first and second peripheral seal surfaces 30, 44 are relieved from the first cutting plane 33. Accordingly, any damage or deformation which may have been caused to the first and second cutting edges 40, 28 may not interfere with the first and second peripheral seal surface 30, 44 during movement of the gate valve member 34. The first and second peripheral seal surfaces 30, 44 may therefore be protected.

It is only when the gate valve member 34 reaches its fully closed position, as illustrated in FIG. 4C, that the first valve seat 18 becomes received within the first seal pocket 42 allowing the first and second peripheral seal surfaces 30, 44 to become engaged only at this point to provide a sealed barrier within the valve apparatus 10.

It should be understood that a corresponding interaction is present between the gate valve member 34 and the second valve seat 50.

Figure 5A:
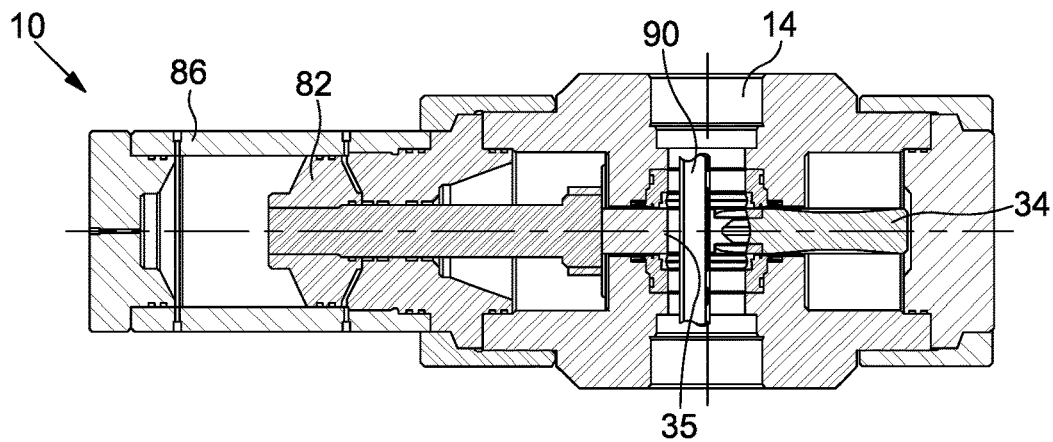
FIGS. 5A to 5C illustrate sequential stages in the operation of the valve apparatus of FIG. 1 in cutting coiled tubing.
Figure 5B:
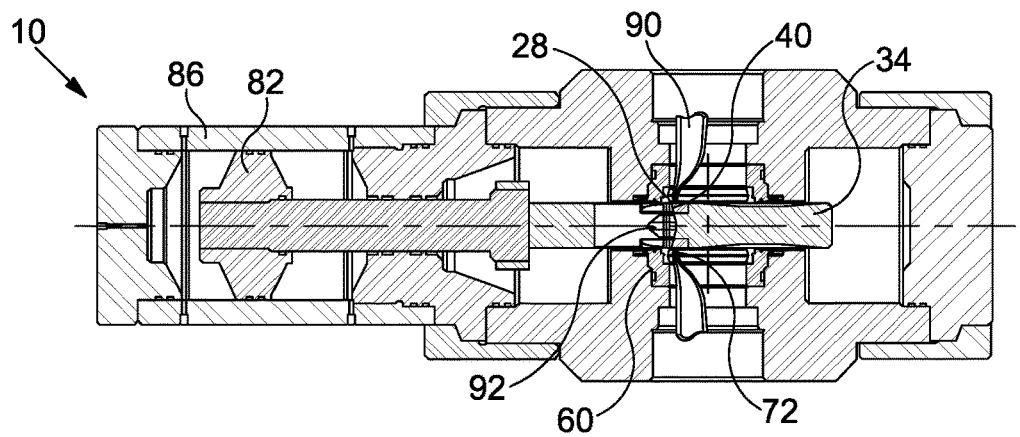
Figure 5C:
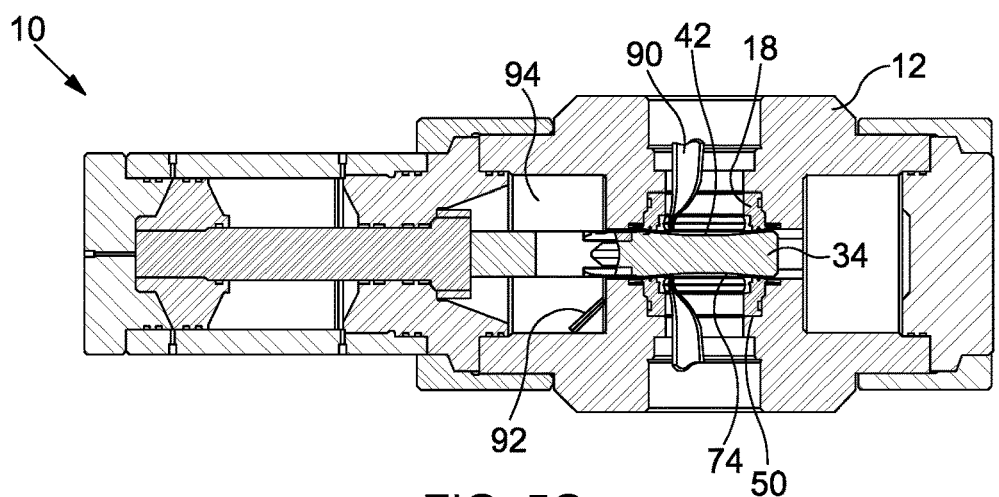

FIGS. 5A to 5C illustrate the gate valve apparatus 10 of FIGS. 1 to 3 in operation, in this example cutting a section of coiled tubing 90. In FIG. 5A the coiled tubing 60 passes through the flow path 14 and through the through bore 35 of the gate valve member 34.

In FIG. 5B, the gate valve member 34 is partially moved from its open position to its closed position by operation of the piston member 82 within its associated cylinder 86. This movement of the gate valve member 34 compresses the tubing 70 and initiates cutting or shearing at two axial locations, specifically between the first and second cutting edges 40, 28, and between the third and fourth cutting edges 72, 60. This cutting action removes an axial slug 92 from the tubing 90.

Continued movement of the gate valve member 34 displaces the removed slug 92 into a receptive cavity 94 formed in the housing 12, as illustrated in FIG. 5C, with the first and second valve seats 18, 50 being received within the respective first and second seal pockets 42, 74. By removing an axial slug 92 from the tubing 90, the requirement to bend the upper and lower remaining tubing sections is largely eliminated. Such bending may potentially require additional actuation force, and in some cases may apply and adverse biasing force on the gate valve member 34 acting in a direction to open said valve member 34.

Figure 6A:
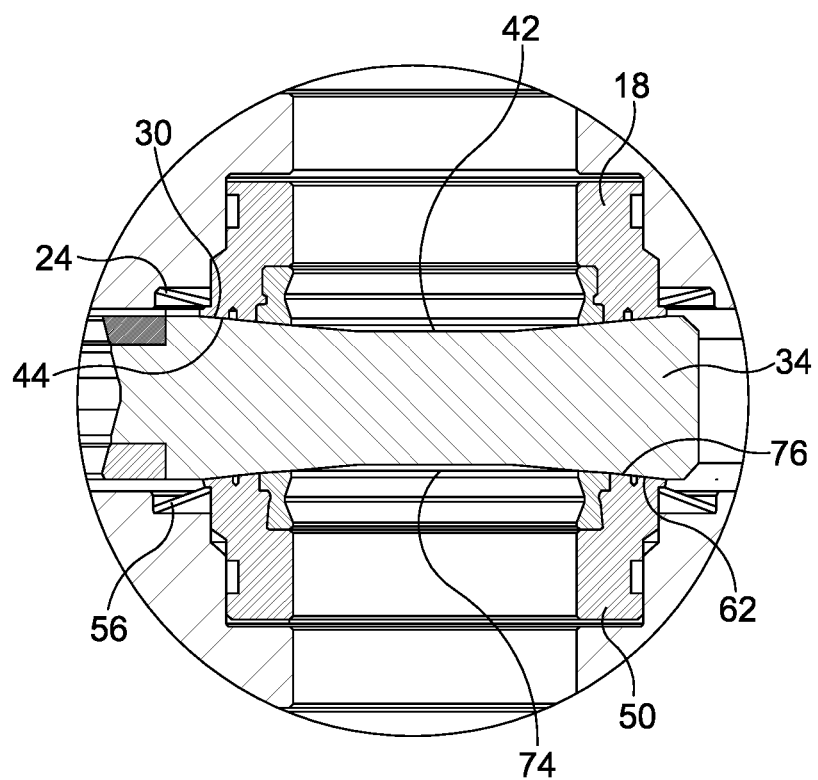
FIG. 6A is an enlarged view of a portion of the valve apparatus of FIG. 1 when in a closed position.
Figure 6B:
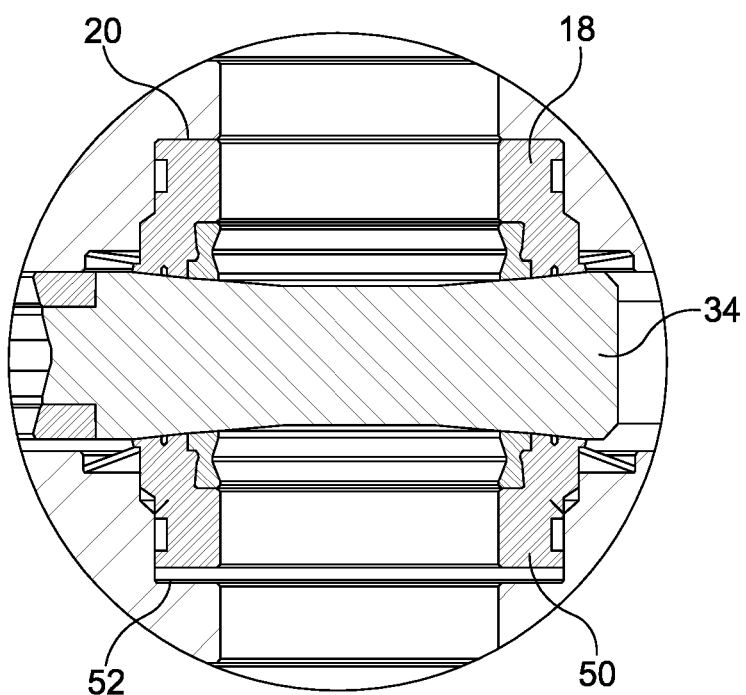
FIG. 6B is the same enlarged view as in FIG. 6A, in this case illustrating containment of pressure from below.

FIGS. 6A and 6B illustrate in more detail the position of the first and second valve seats 18, 50 with reference to the gate valve member 34 when the gate valve member 34 is in its closed position, wherein FIG. 6A illustrates the relative positioning with zero pressure differential applied, and FIG. 6B illustrates the relative positioning with a pressure differential applied from below.

In FIG. 6A, the first and second valve seats 18, 50 are urged into the respective first and second seal pockets 42, 74 of the gate valve member (bringing the respective peripheral seal surfaces 30, 44, 62, 76 into mating engagement) by the action of Belleville spring washers 24, 56.

In FIG. 6B, the valve apparatus 10 is exposed to a pressure dominating from below, which results in an upward (relative to the orientation of the Figures) movement of the first and second valve seats 18, 50 until the first valve seat 18 shoulders-out against the housing 12, specifically within the receptive pocket 20. The gate valve member 34 may thus be pressed against the now stationary first valve seat 18 to maintain sealing.

It will be recognised that a pressure dominating from above can be maintained in the same general manner, specifically with the second valve seat 50 shouldering-out within receptive pocket 52. Accordingly, the gate valve apparatus 10 functions to seal in reverse directions.

In the example provided above the gate valve apparatus 10 includes two valve seats, and provides cutting along two separate cutting planes. However, it should be recognised that at least some of the principles described above may be implemented in a valve apparatus which only includes a single valve seat and cutting plane, while still providing sealing capabilities in reverse directions. Such an alternative example gate valve apparatus 210 will now be described with reference to FIGS. 7A to 7C. The gate valve apparatus 210 is similar in many respects to gate valve apparatus 10, and as such like features share like reference numerals, incremented by 200.

Figure 7A:
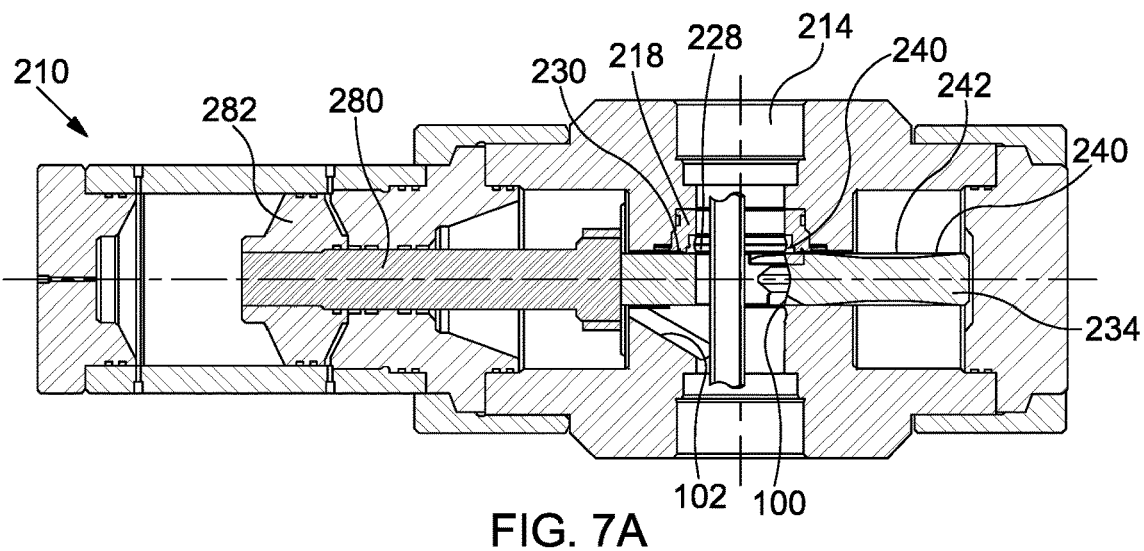
FIGS. 7A to 7C are cross-sectional views of an alternative valve apparatus, shown in sequential stages of operation.
Figure 7B:
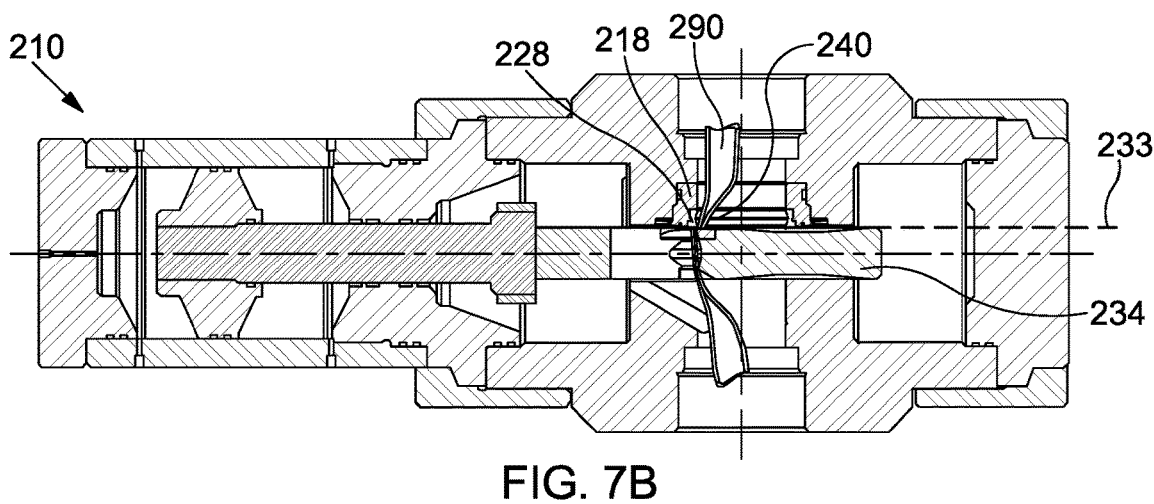
Figure 7C:
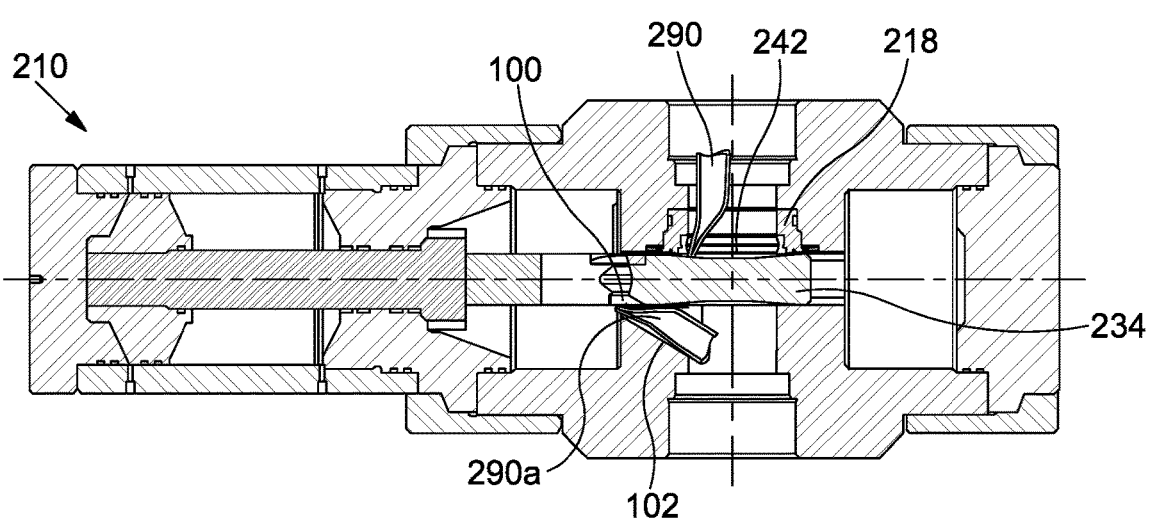

FIGS. 7A to 7C show the gate valve apparatus 210 in sequential stages of closing, from fully open in FIG. 7A, partially closed (and cutting) in FIG. 7B, and fully closed and sealed in FIG. 7A.

The gate valve apparatus 210 includes a housing 212 defining a flow path 214, with a valve seat 218 mounted around the periphery of the flow path 214. The valve seat 218 is identical in form and function to the first valve seat 18 of the gate valve apparatus 10 described above, and thus includes a cutting edge, referred to as a second cutting edge 228, and a first peripheral seal surface 230. No further detailed description will be given for purposes of brevity.

The gate valve apparatus 210 further includes a gate valve member 234 arranged for lateral movement across the flow path, by operation of a piston member 282 connected via a valve stem 280. The gate valve member 234 includes a first cutting edge 240, and a seal pocket 242, wherein the seal pocket 242 is identical in form and function to the first seal pocket 42 of apparatus 10 and as such no further detailed description will be given, except to confirm that the seal pocket 242 includes a recessed second peripheral seal surface 244.

A lower edge of the gate valve member 34 includes a chamfered section 100, and similarly the housing 212 includes a corresponding chamfered section 102.

As illustrated in FIG. 7B, during movement of the gate valve member 234 towards its closed position the first cutting edge 240 is moved along a cutting plane 233 to cut coiled tubing 290 by cooperation with the second cutting edge 228 on the valve seat 218. As illustrated in FIG. 7C, the chamfered regions 100, 102 function to accommodate the lower bent section 290a of the severed tubing 290, and with the valve member 234 fully closed the valve seat 218 is received within the seal pocket 242.

Figure 8A:
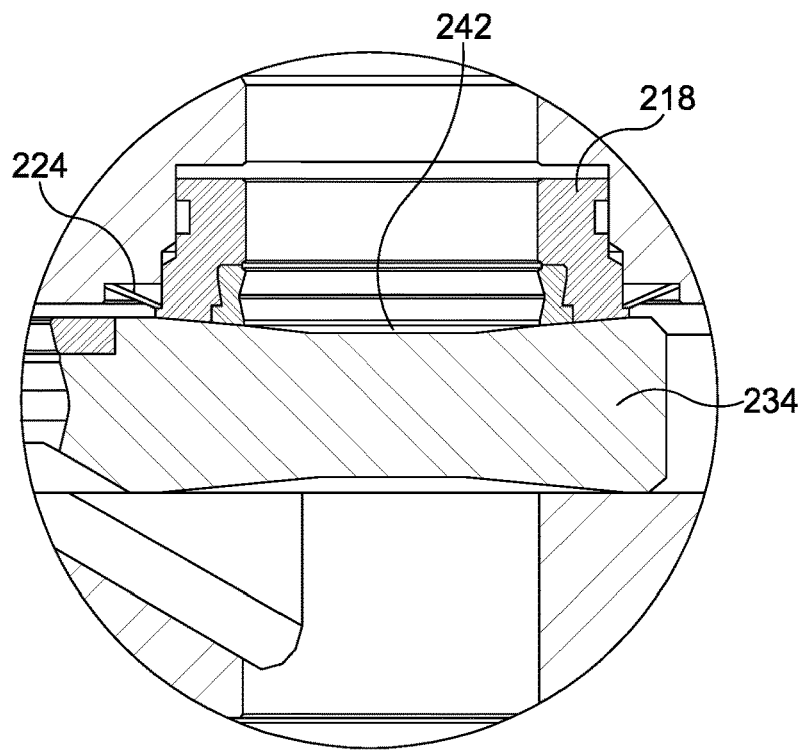
FIG. 8A is an enlarged view of a portion of the valve apparatus of FIGS. 7A to 7C when in a closed position.
Figure 8B:
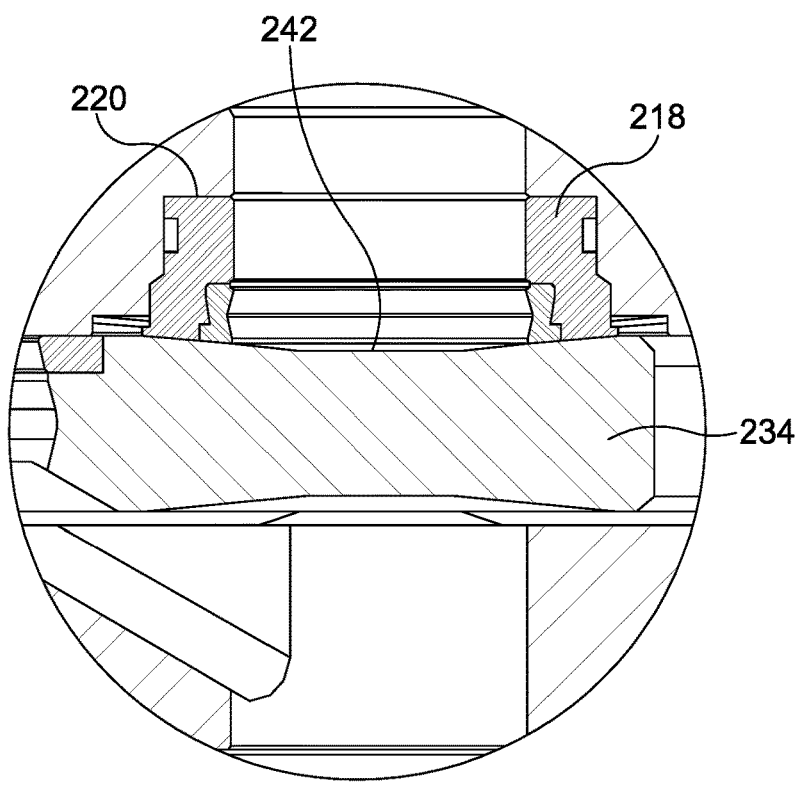
FIG. 8B is the same enlarged view as in FIG. 8A, in this case illustrating containment of pressure from below.

FIGS. 8A and 8B show enlarged views of the gate valve member 234 in its fully closed position. In FIG. 8A, the valve seat 218 is shown urged into the seal pocket 242 of the gate valve member 116 by spring 224. Further, pressure applied from above will press the valve seat 218 downwardly against the valve member 234.

FIG. 8B shows the gate valve member 234 exposed to a pressure from below, which causes the valve seat 218 to moved upwardly and abut a shoulder of a receptive pocket 220 in the housing 112. Pressure will them press the gate valve member 234 against the valve seat 234. Thus, the gate valve apparatus 210 may function to seal in reverse directions.

Figure 9:
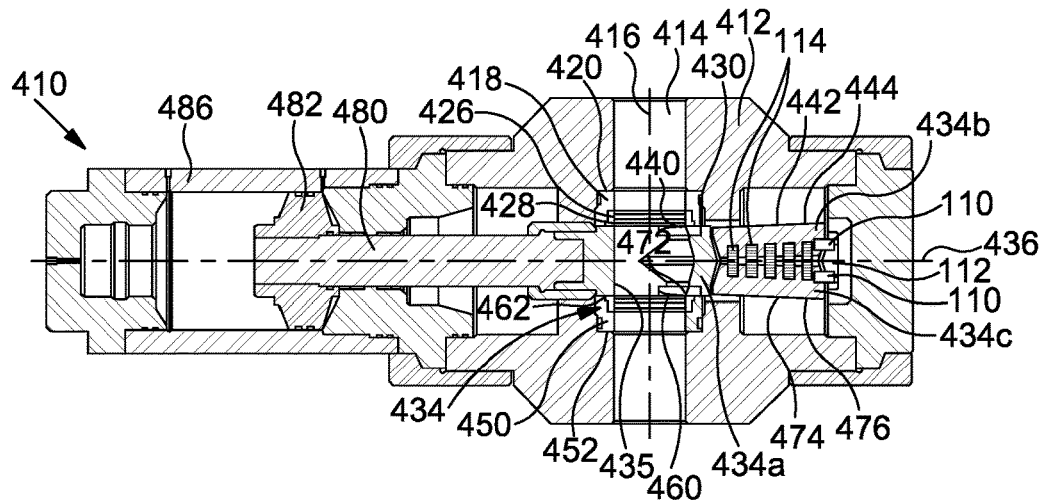
FIG. 9 is a cross-sectional view of another example gate valve apparatus.
Figure 10:
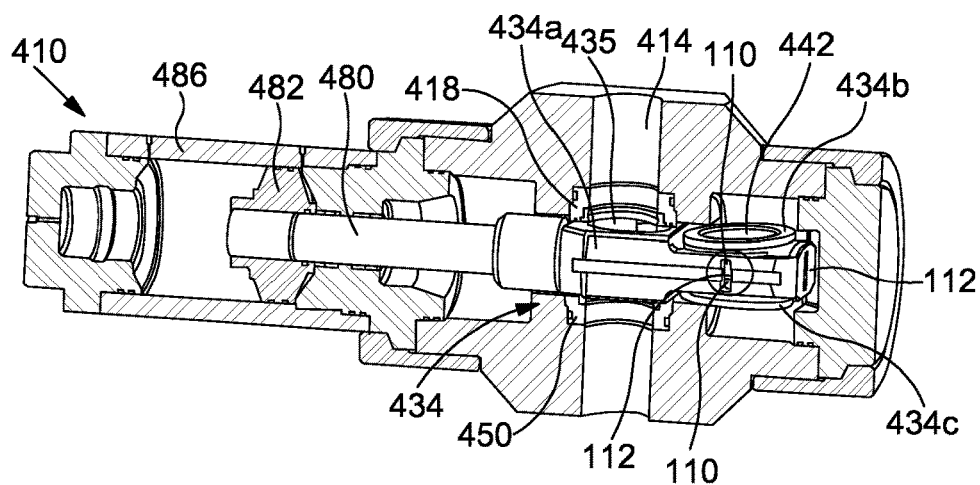
FIG. 10 is a partial sectional isometric view of the valve apparatus of FIG. 9.

FIGS. 9 to 12 illustrate a further example of a gate valve apparatus 410. Gate valve apparatus 410 is similar in many respects to gate valve apparatus 10, and as such like features share like reference numerals, incremented by 400. FIG. 9 provides a sectional view of the gate valve apparatus 410, while FIG. 10 provides a partially sectional perspective view.

The gate valve apparatus 410 includes a housing 412 which defines a flow path 414 which extends along a longitudinal axis 416. A first valve seat 418 is located within the housing 412 around a periphery of the flow path 414. In the present example the first valve seat 418 is provided as a separate insert which is rigidly mounted and sealed within a receptive pocket 420 of the housing.

The first valve seat 418 includes a cutting insert 426 which defines a peripheral cutter or cutting edge 428. For the purposes of the present description the cutting edge 428 will be referred to as a third cutting edge 428. The first valve seat 418 further includes a first peripheral seal surface 430 which tapers upwardly and outwardly from the cutting insert 426.

The gate valve apparatus 410 includes a second valve seat 450 also provided as a separate insert which is rigidly mounted and sealed within a receptive pocket 452 of the housing 412. The second valve seat 450 also includes a cutting insert 458 which defines a peripheral cutter or cutting edge 460. For the purposes of the present description the cutting edge 460 will be referred to as a fourth cutting edge 460. The second valve seat 450 further includes a second peripheral seal surface 462 which tapers downwardly and outwardly from the cutting insert 458.

Figure 11:
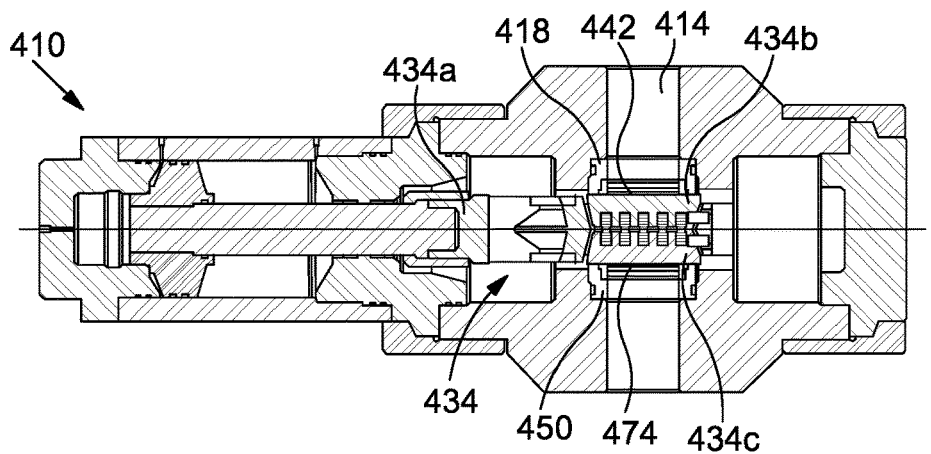
FIG. 11 illustrated the valve apparatus of FIG. 9 in a closed position.

The apparatus 410 comprises a gate valve assembly 434 which is moveable laterally across the flow path 414, generally along a lateral axis 436, from an open position, as illustrated in FIGS. 9 and 10, to a closed position, as illustrated in FIG. 11.

The gate valve assembly 434 includes a valve carriage 434a which includes a through bore 435 aligned with the flow path 414 when the gate valve assembly 434 is in its open position. The valve carriage 434a includes first and second (or upper and lower) axially separated cutting edges 440, 472 which are moveable across the flow path 414 with the gate valve assembly 434. The first and second cutting edges 440, 472 cooperate with the third and fourth cutting edges 428, 460, respectively, of the valve seats 418, 450 to cut any object extending through the flow path 414 during closing.

The gate valve assembly 434 includes a valve member assembly which includes first and second valve members 434b, 434c mounted on the valve carriage 434a via a number of pins 110 received in respective slots 112. The valve members 434b, 434c are urged apart by a number of springs 114 interposed therebetween.

The first valve member 434b includes a first seal pocket 442 defined by a dish-shaped depression, wherein a third peripheral seal surface 444 is provided within the first seal pocket 442. The geometry of the third peripheral seal surface 444 complements or corresponds to the geometry of the first peripheral seal surface 430 of the first valve seat 418, such that the first and third peripheral seal surfaces 430, 444 may be sealingly engaged when the gate valve assembly 434 is closed.

The second valve member 434c is configured similarly to the first valve member 434b and as such includes a second seal pocket 474 defined by a dish-shaped depression, wherein a fourth peripheral seal surface 476 is provided within the second seal pocket 474. The geometry of the fourth peripheral seal surface 476 complements or corresponds to the geometry of the second peripheral seal surface 462 of the second valve seat 450, such that the second and fourth peripheral seal surfaces 462, 476 may be sealingly engaged when the gate valve assembly 434 is closed.

The gate valve apparatus 410 further comprises a valve stem 480 which is coupled at one end to a hydraulic piston 482, and at an opposite end to the gate valve assembly 434 (specifically the valve carriage 434a). In this case the valve stem 480 and valve carriage 434a are rigidly connected, and in some cases may be integrally formed. That is, the valve carriage 434a is not intended to facilitate axial movement within the housing. The requirement for any such axial movement may be fulfilled by the individual first and second valve member 434b, 434c being moveable relative to the valve carriage 434a.

The piston 482 is arranged to stroke within a cylinder 486 to cause movement of the valve member assembly 434 between its open and closed position.

When the valve member assembly 434 is fully closed, as illustrated in FIG. 11, the first valve seat 418 is received within the first seal pocket 442 of the first valve member 434b, by virtue of the first valve member 434b being moveable relative to the valve carriage 434a. Similarly, the second valve seat 450 is received within the second seal pocket 474 of the second valve member 434c, by virtue of the second valve member 434c being moveable relative to the valve carriage 434a. The valve apparatus may thus facilitate sealing along the flow path 414 in reverse directions.

The arrangement of the seal pockets and the various recessed peripheral seal surfaces provides the same benefits defined above in relation to other examples.

Figure 12:
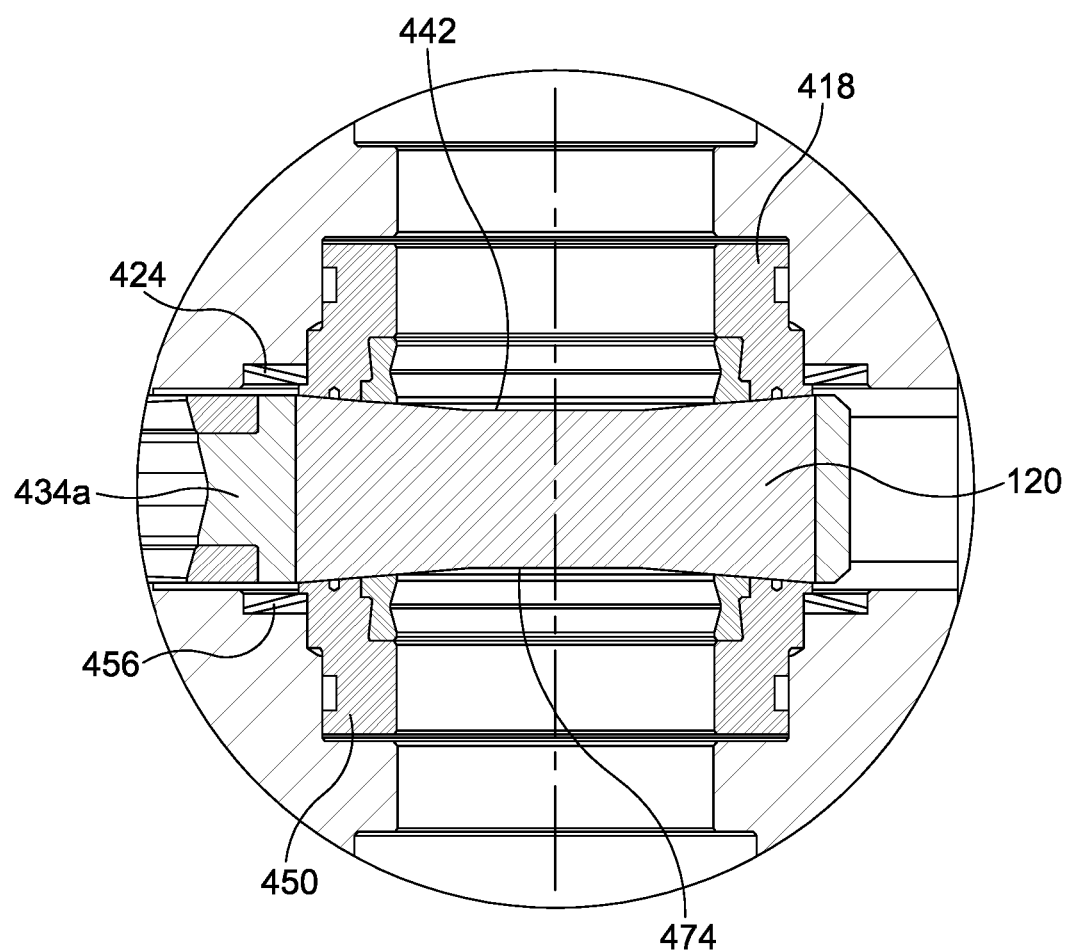
FIG. 12 is a sectional view of a portion of a further modified gate valve apparatus.

Within the gate valve apparatus 410 separate valve members 434b, 434c are provided. However, in an alternative example a single valve member may be provided to perform the same function. Such an arrangement is illustrated in FIG. 12, with the single valve member identified with reference numeral 120. In this case the single valve member 120 is moveable axially relative to the valve carriage 434a, and carries or includes both the first and second seal pockets 442, 474. A further modification in the arrangement of FIG. 12 allows the first and second valve seats 418, 450 to move within the housing 412, biased by respective washer springs 424, 456.

It should be recognised that multiple further variations may be possible to any of the examples provided above.

The invention claimed is:

1. A gate valve apparatus, comprising:
a housing defining a flow path;
a first valve seat located within the housing around a periphery of the flow path and comprising a first peripheral seal surface; and
a gate valve member which is moveable laterally across the flow path between a first position in which the flow path is open and a second position in which the flow path is closed;
a first cutter provided on an edge region of a first surface of the gate valve member to be moveable across the flow path with the gate valve member along a first cutting plane; and
a first seal pocket defined by a depression in the first surface of the gate valve member, wherein a second peripheral seal surface is provided within the first seal pocket,
wherein the first valve seat and the gate valve member are axially moveable relative to each other to permit a portion of the first valve seat to become received into the first seal pocket of the gate valve member when said gate valve member is located within its second position to provide sealing engagement between the first and second peripheral seal surfaces.

2. The gate valve apparatus according to claim 1, wherein the first cutting edge and the second peripheral seal surface are provided at a fixed geometry relative to each other.

3. The gate valve apparatus according to claim 1, wherein the first surface of the gate valve member slidably engages the first valve seat during lateral movement of the gate valve member.

4. The gate valve apparatus according to claim 3, wherein sliding engagement between the first valve seat and the first surface of the gate valve member maintains the first cutting edge aligned with the first cutting plane during lateral movement of the gate valve member.

5. The gate valve apparatus according to claim 1, wherein the geometry of the first seal pocket complements the geometry of the first valve seat to permit the first valve seat to only become received within the first seal pocket when the gate valve member is in its closed position.

6. The gate valve apparatus according to claim 1, wherein the gate valve member and the first valve seat are axially moveable relative to each other in a first relative direction to permit the first valve seat to be received within the first seal pocket when the gate valve member is in its closed position, and axially moveable relative to each other in a reverse second relative direction to permit the first valve seat to be removed from the first seal pocket when the gate valve member is moved from its closed position towards its open position.

7. The gate valve apparatus according to claim 1, wherein the first seal pocket is generally circular and the second peripheral seal surface is generally annular.

8. The gate valve apparatus according to claim 1, wherein the first seal pocket comprises a central region which defines a base of the first seal pocket, and the second peripheral seal surface circumscribes the central region of the seal pocket.

9. The gate valve apparatus according to claim 8, wherein the central region of the first seal pocket is aligned with the flow path of the housing when the gate valve member is in its closed position such that the central region defines an impact region for any object travelling within the flow path.

10. The gate valve apparatus according to claim 1, wherein the first valve seat comprises a second cutting edge configured to cooperate with the first cutting edge of the gate valve member to cut an object located therebetween.

11. The gate valve apparatus according to claim 10, wherein the second cutting edge defines an inner periphery of the first valve seat and the first peripheral seal surface is positioned radially outwardly of the second cutting edge.

12. The gate valve apparatus according to claim 10, wherein the first peripheral seal surface is relieved relative to the second cutting edge.

13. The gate valve apparatus according to claim 10, wherein the second cutting edge bears against the first surface of the gate valve member during lateral movement of said gate valve member.

14. The gate valve apparatus according to claim 1, wherein relative axial movement between the first valve seat and the gate valve member facilitates sealing to be achieved in one or both directions across the gate valve member when closed.

15. The gate valve apparatus according to claim 1, wherein the first valve seat is axially moveable relative to the housing.

16. The gate valve apparatus according to claim 15, wherein the first valve seat is biased towards engagement with the gate valve member.

17. The gate valve apparatus according to claim 1, wherein both the first valve seat and the gate valve member are axially moveable within the housing to permit relative axial movement therebetween.

18. The gate valve apparatus according to claim 1, comprising:
a second valve seat located within the housing on an opposing side of the gate valve member from the first valve seat, the second valve seat comprising a third peripheral seal surface;
a third cutting edge provided on an edge region of a second surface of the gate valve member and moveable across the flow path with the gate valve member;
a second seal pocket defined by a depression in the second surface of the gate valve member, wherein a fourth peripheral seal surface is provided within the second seal pocket,
wherein the second valve seat and the gate valve member are axially moveable relative to each other to permit a portion of the second valve seat to become received into the second seal pocket of the gate valve member when said gate valve member is located within its second position to provide sealing engagement between the third and fourth peripheral seal surfaces.

19. The gate valve apparatus according to claim 18, wherein the second valve seat comprises a fourth cutting edge which cooperates with the third cutting edge to cut an object located therebetween.

20. The gate valve apparatus according to claim 1, comprising a valve stem coupled with the gate valve member to facilitate lateral movement of the gate valve member, the valve stem being configured to be coupled to an actuator.

21. The gate valve apparatus according to claim 20, wherein the gate valve member and the valve stem are coupled together via a stem connector, the stem connector permitting the gate valve member to move axially within the housing without corresponding axial movement of the valve stem.

22. A gate valve apparatus, comprising:
a housing defining a flow path;
a first valve seat located within the housing around a periphery of the flow path and comprising a first peripheral seal surface;
a second valve seat located within the housing around a periphery of the flow path and comprising a second peripheral seal surface; and
a gate valve assembly which is moveable laterally across the flow path between an open position and a closed position, wherein the gate valve assembly comprises:
a valve carriage;
first and second axially separated cutting edges provided on the valve carriage to be moveable across the flow path with the gate valve assembly;
a valve member assembly mounted on the valve carriage;
a first seal pocket defined by a depression in a first surface of the valve member assembly, wherein a third peripheral seal surface is provided within the first seal pocket; and
a second seal pocket defined by a depression in an opposite second surface of the valve member assembly, wherein a fourth peripheral seal surface is provided within the second seal pocket,
wherein the valve member assembly is axially moveable relative to the valve carriage such that when the gate valve assembly is in its closed position relative axial movement may be established between the valve member assembly and the respective first and second valve seats such that the first valve seat is receivable into the first seal pocket to establish sealing engagement between the first and third peripheral seal surfaces, and the valve seat is receivable into the second seal pocket to establish sealing engagement between the second and fourth peripheral seal surfaces.

23. The gate valve apparatus according to claim 22, comprising an interface arrangement interposed between the valve member assembly and the valve carriage, wherein the interface arrangement permits the valve member assembly to be mounted on the valve carriage.

24. The gate valve apparatus according to claim 22, wherein the valve member assembly comprises a single valve member with the first and second seal pockets formed in opposing surfaces of the single valve member.

25. The gate valve apparatus according to claim 22, wherein the valve member assembly comprises first and second valve members mounted relative to one another on the valve carriage, the first valve member comprising the first seal pocket and the second valve member comprising the second seal pocket.

26. The gate valve apparatus according to claim 25, wherein both of the first and second valve members are moveable relative to the valve carriage.

27. The gate valve apparatus according to claim 25, comprising a biasing arrangement configured to bias movement of the first valve member towards the first valve seat, and bias movement of the second valve member towards the second valve seat.

28. The gate valve apparatus according to claim 27, wherein the biasing arrangement is configured to urge the first valve member and the second valve member apart at least in the axial direction.

29. The gate valve apparatus according to claim 22, wherein the first surface of the valve member assembly slidably engages the first valve seat during lateral movement of the gate valve assembly, and the second surface of the valve member assembly slidably engages the second valve seat during lateral movement of the valve member assembly.

\* \* \* \* \*